3,224,956
SEPARATION OF WAX FROM OIL
Joseph Phillips, Petrolia, Pa., and Bernard R. Bluestein, Glen Rock, N.J., assignors to Witco Chemical Company, Inc., New York, N.Y., a corporation of Delaware
No Drawing. Filed July 22, 1963, Ser. No. 296,446
6 Claims. (Cl. 208—33)

This invention relates to new and useful improvements in the separation of wax from oil. The invention more particularly relates to a novel deoiling and/or dewaxing aid and is a continuation-in-part of application Serial No. 22,110 filed April 4, 1960, now abandoned.

The separation of wax from oil as, for example, in the deoiling of wax or the dewaxing of oil, may be effected by dissolving the starting material in an organic solvent, followed by cooling the solvent solution to a temperature at which the wax solidifies and may be separated as, for example, by filtration, settling, centrifuging or the like.

One object of this invention is to effect the above mentioned separation process with a more effective separation of the wax and oil.

A further object of this invention is to effect the above-mentioned separation with a quicker separation of the solidified wax, as, for example, an increased filtration rate.

A still further object of this invention is to allow the effective separation with cheaper and safer solvents than were previously required.

A still further object of this invention is a novel deoiling and dewaxing aid; these and still further objects will become apparent from the following description:

In accordance with the invention, it has surprisingly been discovered that in the separation of wax from oil by dissolving the wax-oil mixture in an organic solvent, cooling the solution to a temperature at which the wax solidifies, and separating the solid wax from the liquid phase, the separation can be substantially improved and facilitated if the solution contains a minor quantity of an oxidized microcrystalline wax. The oxidized microcrystalline waxes suitable for use in the wax-oil separation in accordance with the invention have an acid number (ASTM D1386–55T) of 15 to 40, a saponification number (ASTM D1387–55T) of 35 to 100 and a Saybolt viscosity at 210° F. (ASTM D88–56) of 250–350.

The oxidized microcrystalline wax should be present in amounts from 0.01% to 2% and preferably from 0.05 to 0.75% based on the material being separated.

The oxidized microcrystalline wax may be produced from any known or commercially available microcrystalline or certain synthetic hydrocarbon waxes having a melting point (ASTM D127) of between 155 and 215° F. and preferably between about 190 and 200° F., a penetration number (ASTM D1321–57T) at 77° F. between about 1 and 30, and preferably between about 3 and 7, and a Saybolt viscosity at 210° F. (ASTM D88–56) of between 70 and 100, and preferably between 80–95. The microcrystalline wax may have an average molecular weight of about 600–690 and a composition of saturated hydrocarbons ranging from about $C_{35}$ to $C_{85}$, which are mainly aliphatic in nature. About 80–95% of this wax is capable of urea adduction.

To form the oxidized microcrystalline wax used as the separation aid, the starting microcrystalline wax must be oxidized with air (oxygen-enriched air, $O_2$-containing gas, pure oxygen, or $O_2$-containing azone) under specific conditions. The oxidation is preferably catalytic and as a catalyst there may be used metal oxidation catalysts, such as managanese, cobalt, and similar oxidation catalysts. Preferably catalysts include manganese naphthenate, cobalt naphthenate, potassium permanganate, manganese dioxide, manganese stearate, cobalt stearate, manganese oleate, cobalt oleate, manganese resinate, cobalt resinate, manganese linoleate, cobalt linoleate. The most preferred catalysts include manganese naphthenate or cobalt naphthenate containing about 6.0% manganese or cobalt metal, respectively, in a 57% solution of mineral spirits. Solid manganese naphthenate is also effective, as is cobalt naphthenate.

The catalysts should be present in amount of 0.5 to 3.0%, preferably 0.8 to 1.2%, based on the microcrystalline wax.

When, for example, manganese catalysts are used, the same should be present in an amount sufficient to give at least 0.1% manganese, which for example corresponds to 1% manganese naphthenate. In any event, a catalyst containing the equivalent of about 0.07% metal must be present.

The oxidation is effected by flowing the air or the oxygen-containing gas in contact with the wax and catalyst at an elevated temperature.

The catalyst, when used in a solution of mineral spirits, is added directly to the melted wax. The air or oxygen dispersion serves to intimately mix the catalyst and the melted wax. Although the catalyst is preferred in the form of a solution in mineral spirits, a solid form of the catalyst may be used. In this case the catalyst is dissolved and peptized in high concentration in a portion of the melted wax at a high temperature, such as 280° F. Thus, a concentrate of the catalyst in the wax is formed, which effects the oxidation when present in the melted wax in proper amount.

The air or oxygen-containing gas can be intimately mixed and dispersed in the melted wax as, for example, by passing the same through a container containing filling bodies, such as porous stones, Raschig ring, or the like. Preferably, the air or oxygen-containing gas may be intimately mixed and dispersed in the melted wax by passage through an air dispersion spider. The spider assembly, which should be placed at the bottom section of the oxidation vessel, has eight horizontal outlet pipes. Each pipe contains many small diameter orifices. Instead of pipes having many small orifices, porous sandstone dispersion balls or steel or stainless steel spargers may be connected to the spider assembly. Mechanical stirring means may be incorporated into the air or oxygen-containing gas dispersion assembly. However, in this case the stirring itself and the position of the stirrer affect the proper rate of flow for the air or the oxygen-containing gas.

The temperature of the oxidation is critical and must be at least 250° F. and preferably at least 280° F. The upper temperature is determined merely by avoiding the decomposition of the mixture and practical aspects, though it is not generally feasible to operate at temperatures above 360° F.

The rate of gas flow, such as the air flow, through the wax, measured at standard conditions of temperature and pressure, is extremely critical and is determined by the quantity of wax being oxidized, the kind of oxidizing gas mixture being used, and the type of gas dispersion equipment. Each set of conditions has its own optimum rate of gas flow.

Generally, the rate of gas flow, such as air flow, through the wax will be one standard cubic foot per minute (standard conditions of the temperature and pressure) for each 20–1000 lbs. of wax. A preferable air flow is one standard cubic foot per minute for 250 lbs. of wax.

The oxidation may be effected by any pressure varying between 10 and 45 lbs. per square inch absolute (p.s.i.a.) and preferably at 14.7 lbs. per square inch absolute (p.s.i.a.) (atmospheric pressure) for economical convenience.

The termination of the oxidation reaction may be determined by the acid number (ASTM D1386–55T), saponification number (ASTM D1387–55T), and the Saybolt viscosity at 210° F. (ASTM D88–56). The oxidized wax will have an acid number of 15 to 40, saponification number of 35 to 100, the Saybolt viscosity at 210° F. of 150 to 600 Saybolt Universal seconds. The wax most active as a separation aid will have an acid number of 25 to 35, saponification number of 70–90, and Saybolt viscosity of 250–350. The oxidation reaction generally takes about 70 to 80 hours under optimum conditions, although another type of separation aid wax can be formed in 31 to 33 hours. It is possible for the proper oxidized wax to be formed after 25 hours and to take as long as 120 hours.

After the oxidation, the catalyst may be removed from the oxidized wax by the usual methods, such as for example, by treatment with aqueous hydrochloric acid or cation exchange resins and by chromatography. However, the catalyst need not be removed for the use of the oxidation product as the separation aid.

It is also possible to oxidize the wax without the use of a catalyst as, for example, by blowing air through the wax at a temperature of 240–250° F. at a rate of about one standard cubic foot per 90 lbs. of wax per minute. When the wax has developed an acid number of about 25–30, with a corresponding saponification number of 55–65, and a Saybolt viscosity at 210° F. of about 170, the temperature is raised to approximately 290° F. and the air flow rate reduced to one cubic foot per 250 lbs. of wax per minute. The oxidation is completed when the wax has an acid number of approximately 30–35, a saponification number between 80 and 85, and a Saybolt viscosity at 210° F. of 270–320.

It is also possible, prior to such use, to neutralize or at least partially neutralize the oxidized wax, using an alkali as, for example, sodium carbonate, sodium hydroxide, sodium bicarbonate, potassium carbonate, potassium hydroxide, potassium bicarbonate, soda lime, lime, barium hydroxide, barium carbonate, magnesium hydroxide, etc. The neutralization of the oxidized wax increases its efficiency as a filtration aid, to the detriment of its effectiveness as a centrifuging aid. The wax should therefore preferably be neutralized when the separation of the wax from the oil in the wax-oil mixture is to be effected by filtration, but not when this separation is to be effected by centrifuging.

The oxidized microcrystalline wax may be directly incorporated into the material being separated or into the solvent used for deoiling or dewaxing, or may be first dissolved in an oil as, for example, neutral oils, semi-treated or finished mineral oils, filter washout oils, high pour lube oils, lube oils, etc., in the form of a solution at from 10% to 90%, and preferably 20% concentration in the oil. This oil solution may then be added to the mixture and/or solvent, or stock, or solution.

The oxidized microcrystalline wax as mentioned is added to the mixture in a concentration of 0.01% to 2.0%, and preferably 0.05% to 0.75% based on the stock to be separated, and in all other respects the deoiling or dewaxing is effected in the conventional and well known manner.

The invention is thus useful in the deoiling of waxes, such as micro- or macro-waxes, in order to produce a harder wax, or may be used for dewaxing oil as, for example, lubricating oil, in order to reduce its pour point.

The waxes or "crude petrolatum" stocks which may be deoiled in accordance with this invention may be very soft to very hard, have low melting to high melting point, and have low viscosity to high viscosity. Examples of stocks which have been so treated, have the following properties:

TABLE 1.—PROPERTIES OF SOME DEOILING STOCKS

|  | A | B | C | D | E | F | G | H |
|---|---|---|---|---|---|---|---|---|
| Congealing Point, ASTM D938, ° F. | 110 | 100 | 120 | 125 | 145 | 150 | 155 | 175. |
| Consistency, ASTM D937 | 40 | 180 | 125 | 125 | 50 | 55 | 35 | 10. |
| Viscosity Sayb. at 210° F. | 40 | 95 | 85 | 85 | 65 | 85 | 80 | 90. |
| Flash Pt. | 380 | 550 | 550 | 525 | 515 | 570 | 575 | 580. |
| Type | Paraffinic | Micro | Micro | Semimicro | Micro | Micro | Micro | Micro. |
| Source | Penna. Distillate. | Mid-Continent Residual | Mid-Continent Residual | Penna. Residual. | M-C Dist. | M-C Residual. | Gulf Coast Residual | Gulf Coast Residual |

Lubricating oils must be fluid at ambient temperatures if they are to act as satisfactory lubricants. For example, if the oil in an automobile is solid, it will not be able to be pumped to the bearings, so that bearing failure is apt to occur. A test for fluidity which is accepted by the industry is the ASTM pour point, which measures the lowest temperature at which an oil will flow. A satisfactory lubricating oil must then have a pour point below the lowest temperature at which it will be used. Since petroleum oils normally contain enough wax so that their pour points are well above this minimum temperature, they must be dewaxed to make them suitable for use as lubricating oils. Some of the wax bearing oils which have been dewaxed in accordance with this invention are characterized by the following properties.

TABLE 2.—PROPERTIES OF SOME DEWAXING STOCKS

|  | I | J | K | L | M | N | O |
|---|---|---|---|---|---|---|---|
| Congealing Point, ASTM D938° F. | 95 | 90 | 106 | 126 | 133 | 134 | 120 |
| Viscosity, Saybolt at 210° F. | 60 | 220 | 118 | 70 | 129 | 103 | 135 |
| Flash Point | 450 | 610 | 570 | 525 | 575 | 575 | 565 |
| Source | Penna. Mid-Continent | | | Mid-Continent | | | |

The solvents which may be used for the dewaxing or deoiling operation include any of the conventional or well known solvents, as for example, naphtha, benzol, methyl ethyl ketone, naphtha-methyl ethyl ketone, ethylene dichloride, propane, hexane, toluene-MEK, benzol-MEK, ethylene dichloride-benzol.

The wax to be deoiled or the oil to be dewaxed is admixed with the solvent and the oxidized microcrystalline wax at a temperature and with a quantity of solvent sufficient to form a complete solution. In the case of deoiling wax, elevated temperatures of about 125° F. to 275° F. may be required, and amounts of solvent of about 100% to 900%, based on the wax, are generally used. For the dewaxing of oil, temperatures at 100° F. to 150° F. and amounts of solvents from 100% to 400%, based on the oil, are generally required. The solution is then cooled or chilled to a temperature at which the wax will solidify, and the solidified wax is separated as, for example, by settling, filtration, centrifuging or the like. In commercial operation, it often is desirable to effect the separation by filtration, using a rotary filter press. The wax cakes obtained on the rotary filter or filter press may be recovered as a wax and/or liquid or oil separated from the solvent as the dewaxed oil.

In the past it has often been necessary to use a fairly volatile and inflammable and expensive solvent, such as benzol-ethyl methyl ketone or ethylene dichloride, or hexane, in order to achieve the separation results necessary or desired.

When using the oxidized microcrystalline wax as the separation aid in accordance with the invention, it has been found that in these cases the much cheaper and less dangerous naphtha or naphtha-methyl ethyl ketone can be used with even better results.

Very surprisingly, the use of the separation aid in accordance with the invention, in addition to producing a more effective and efficient separation of the wax and oil, increases the separation rate, as for example, increases the filtration rate.

In the deoiling of wax, a drier, harder wax is obtained in a high yield, and the dewaxing of oil produces a higher yield of oil with a lower concentration of wax, and thus a lower pour point.

The following examples are given by way of illustration and not limitation:

Example 1

Twelve thousand five hundred (12,500) pounds of a hard, high melting point, white microcrystalline wax (ASTM melting point, 195° F.; penetration at 77° F. ASTM D1321–57T, 6; Lovibond color in 2″ cell, 1Y; and Saybolt viscosity at 210° F., ASTM D88–56, 90 S.U.S.) was heated to about 220° F., in a tank of about 2100 gallons capacity, equipped with an inside steam coil. One hundred and twenty-six (126) pounds of manganese naphthenate dissolved in an approximately equal amount of mineral spirits was added to the melted wax and thoroughly mixed with it. The mixture of wax-containing manganese catalyst was heated to 290° F. and the temperature was kept constant at 290° F. by automatic heating and cooling equipment.

Air was passed into the wax mixture at the rate of 30 standard cubic feet per minute measured at conditions of standard temperature and pressure. The air was dispersed by bubbling it through an air dispersion spider at the bottom of the tank with many small ($\frac{1}{16}$″ diameter) orifices totaling about 3500. The length of time required to complete the oxidation was 67 hours. Thus, an oxidized wax product, which is suitable as a deoiling or dewaxing separation aid, was manufactured in 94% yield (9900 pounds) based on the raw material wax. This product was a hard, high melting brown wax with the following properties: ASTM melting point, 182° F.; ASTM (D1321–57T) penetration at 77° F., 8; ASTM (D88) Saybolt viscosity at 210° F., 295 S.U.S.; acid number, 27; and saponification number, 75.

Example 2

Seven thousand pounds of the hard, high melting point, white microcrystalline wax used in Example 1, containing 10% Fischer-Tropsch wax and seventy pounds of manganese catalyst, were mixed together in a tank of about 2100 gallons capacity and heated to 250° F. While the temperature was kept constant at 250° F., air was passed into the wax mixture at a rate of flow of 80 standard cubic feet per minute. The air was dispersed in the wax mixture with the same air spider equipment described in Example 1.

After 34 hours of oxidation, 6500 pounds (93% yield) of a wax product was obtained which is suitable as a dewaxing or deoiling separation aid. The properties of this product were the following: ASTM melting point, 196° F.; ASTM (D1321) penetration at 77° F., 9; ASTM (D88) Saybolt viscosity at 210° F., 206 S.U.S.; acid No., 35; saponification No., 70; and ASTM color, 2.

Example 3

A similar oxidation was performed as in Example 2, but using a hard, high melting point, white microcrystalline wax (ASTM melting point, 200° F.; ASTM (D1321) penetration at 77° F., 5) which contained no Fischer-Tropsch wax. After 31 hours a yield of 85% wax product was obtained, suitable as a deoiling or dewaxing separation aid, with the following properties: ASTM melting point, 186° F., ASTM (D1321) penetration at 77° F., 9; ASTM (D88) Saybolt viscosity at 210° F., 169 S.U.S.; ASTM color, 2; acid No., 30; saponification No., 70.

Example 4

One hundred and twenty pounds of a hard, high melting point, light yellow-colored microcrystalline wax (ASTM melting point, 182° F.; ASTM D1321 penetration at 77° F., 16; ASTM color, 1½; and ASTM D88 Saybolt viscosity at 210° F., 78 S.U.S.) was melted and heated to 280° F. One and two-tenths pounds of manganese naphthenate was admixed with the melted wax. The temperature of the mixture was kept constant at 270° F. with a thermo-regulator controlling a steam pressure valve. Air was passed into the wax mixture at the rate of 5.6 standard cubic feet per minute and dispersed through five porous sandstone dispersion balls.

After 74 hours of oxidation, an oxidized product was obtained in 92% yield, suitable as a dewaxing or deoiling separation aid. The properties of this product were: ASTM melting point, 171° F.; ASTM (D1321) penetration at 77° F., 15; ASTM (D88) Saybolt viscosity at 210° F., 247 S.U.S.; acid No., 27; and saponification No., 75; ASTM color, 4½.

Example 5

Four grams of manganese naphthenate were admixed with four hundred grams of Fischer-Tropsch wax in a one-liter Pyrex glass flask and heated to 270° F. Air was dispersed with a frited glass dispersion tube into the wax mixture with a slight formation of foam. After 26 hours an oxidized was was obtained, which was suitable as a dewaxing or deoiling separation air. The oxidized wax has the following properties: ASTM melting point, 200° F.; ASTM (D1321) penetration at 77° F., 3; ASTM color, 2; ASTM (D88) Saybolt viscosity at 210° F., 134 S.U.S.; acid No., 24; and saponification No., 50.

Example 6

Example 5 was repeated using a softer, intermediate melting point, white microcrystalline wax. The wax properties were: ASTM melting point, 172° F.; ASTM (D1321) penetration, 28; Lovibond color in 2″ cell, 1Y; and ASTM (D88) Saybolt viscosity at 210° F., 83. After 26 hours of oxidation, the properties of the oxidized wax product, suitable as a deoiling and dewaxing separation aid, were: ASTM melting point 164° F.; ASTM (D1321) penetration at 77° F., 20; ASTM color, 4; ASTM (D88) Saybolt viscosity at 210° F., 188 S.U.S.; acid No., 24; and saponification No., 60.

Example 7

Example 5 was repeated using the hard, microcrystalline wax described in Example 1 and cobalt naphthenate in place of manganese naphthenate. After 43 hours of oxidation, the properties of the oxidized wax product, suitable as a deoiling and dewaxing separation aid, were: ASTM melting point, 181° F.; ASTM (D1321) penetration at 77° F., 7; ASTM color, 2; ASTM (D88) Saybolt viscosity at 210° F. 182 S.U.S.; acid No., 25; and saponification No., 75.

Example 8

A crude petrolatum having a melting point of 150° F., consistency of 55, and viscosity at 210° F. of 85 S.U.S. was admixed with 1% of the oxidized microcrystalline wax obtained in Example 1 at a temperature of 200° F. This blend was dissolved in amount of 25% in naphtha and the solution was chilled to 80° F. and filtered over a paper filter through a Büchner funnel under vacuum. The wax obtained on the funnel was found to have an ASTM D938 congealing point of 177° F. and an ASTM (D1321) needle penetration No. of 18.

When the example was repeated without the use of the oxidized microcrystalline wax, the wax obtained on the filter was extremely soft and had a congealing point of only 150° F. The funnel used was 4⅝" in diameter and when operating with the oxidized microcrystalline wax, filtration of 200 cc. of the chilled solution was obtained within 20 minutes, whereas without the oxidized wax it took 45 minutes.

*Example 9*

Example 8 was repeated using, however, in place of the naphtha, benzol-methyl-ethyl ketone. In this case, with the 1% of the oxidized microcrystalline wax, the wax obtained on the filter had a congealing point of 166° F. and a penetration number of 37, whereas without the oxidized microcrystalline wax, the wax obtained on the filter was extremely soft, having no penetration number and a melting point of 153° F. The filtration time with the oxidized microcrystalline was 20 minutes whereas without the same, the filtration time was 45 minutes.

*Example 10*

Examples 8 and 9 were repeated using the oxidized microcrystalline wax of Examples 2, 3, and 4 respectively, and in all cases comparable results were obtained.

*Example 11*

A long residuum from Pennsylvania crude oil was admixed with 1% of the oxidized microcrystalline wax of Example 1, at a temperature of 150° F.
The properties of the residuum were as follows:

Congealing point, ASTM D938 _____°F__ 95
Viscosity, Saybolt at 210° F. _____ 60
Flash point, O.C. _____°F__ 450

This was admixed with 3 times its quantity of benzol and methyl-ethyl ketone and chilled to 0° F. The mixture was then filtered through a Büchner funnel and dewaxed oil was obtained in a yield of 88%, having a pour point of 35–40° F. with a filtration time of 10 minutes. The pour point method used was the ASTM Method D97–57.

When the experiment was repeated, however, without the use of the oxidized microcrystalline wax, only an 80% yield of the dewaxed oil of the same pour point was obtained, and the filtration time required was 15 minutes.

*Example 12*

Oxidized microcrystalline wax of Example 1 was treated at 250° F. for two hours with 6% by weight of sodium carbonate. The crude petrolatum of Example 8 was admixed with 0.25% of the neutralized oxidized wax at 180° F. Portions of this blend were admixed with different solvents and chilled to 70° F. The chilled blends were filtered through filter paper in a Büchner funnel. Samples of crude petrolatum without added neutralized oxidized microcrystalline wax were treated in a similar manner. The results were as follows:

TABLE 3.—DEOILING OF CRUDE PETROLATUM

| Solvent | Naphtha-MEK | | Benzol-MEK | |
|---|---|---|---|---|
| | A | B | C | D |
| Neutralized oxidized Wax used, percent | 0.25 | None | 0.25 | None |
| Conc. of Stock, percent | 40 | 40 | 25 | 25 |
| Filtration Time/200 cc., minutes | 3 | 20 | 2 | 25 |
| Wax Properties: Yield, percent | 30 | (¹) | 25 | 49 |
| Congealing Pt., ° F | 168 | | 171 | 160 |
| Penetration, Needle | 25 | | 15 | 78 |

¹ No separation.

Thus, without the oxidized wax in one case, no separation of phases could be made, and in the other case the wax phase had too high a penetration—was too soft, indicating very poor separation.

Wax distillate samples of sample A in Table 1 were admixed with 0.25% of the neutralized oxidized microcrystalline wax at 180° F. This blend was admixed with naphtha-MEK and was chilled to 65° F. The chilled blend was filtered through filter paper in a Büchner funnel. A sample of the same wax distillate without added neutralized oxidized microcrystalline wax was treated in a similar manner, using benzol-MEK. The results were as follows:

TABLE 4.—DEOILING OF WAX DISTILLATE

| Solvent | Naphtha-MEK | | Benzol-MEK |
|---|---|---|---|
| | E | F | G |
| Neutralized Oxidized Wax Used, percent | 0.5 | None | None |
| Conc. of Stock, percent | 25 | 25 | 25 |
| Filtration time/200 cc., minutes | 10 | 15 | 10 |
| Wax Properties: | | | |
| Yield, percent | 11 | 12 | 12 |
| Congealing Pt., ° F | 140 | 127 | 132 |
| Penetration, Needle | 37 | 93 | 35 |

It is apparent that with the oxidized microcrystalline was it is possible to utilize the cheaper and safer naptha in place of benzol at no loss in efficiency.

A sample of undewaxed oil of Sample I in Table 2 was admixed with 0.25% of the neutralized oxidized microcrystalline wax at 150° F. The blend was admixed with naphtha-MEK and chilled to 0° F. The chilled blend was filtered through filter paper in a Büchner funnel. Another sample of the same undewaxed oil without added neutralized oxidized wax was treated in a similar manner. The results were as follows:

TABLE 5.—DEWAXING UNDEWAXED OIL

| Solvent | Naphtha-MEK | | Benzol-MEK |
|---|---|---|---|
| | H | I | J |
| Neutralized Oxidized Wax used, percent | 0.25 | None | None |
| Conc. of Stock, percent | 25 | 25 | 25 |
| Filtration Time/200 cc., minutes | 4 | 10 | 15 |
| Dewaxed Oil: | | | |
| Yield, percent | 86 | 82 | 85 |
| Pour Point, ° F | 25–30 | 35–40 | 40–45 |

*Example 13*

An undewaxed oil sample of Sample I, Table 2, was admixed with 0.5% of oxidized microcrystalline wax obtained in Example 2 at 200° F. This blend was dissolved in naphtha to produce a 25% solution and chilled to 0° F. When 200 cc. thereof was filtered as in Example 9, filtration time required only 1 minute and an oil of 40–45° F. pour in yield of 82% based on the undewaxed oil, was obtained.

When the example was repeated without the use of microcrystalline wax, the oil obtained had a pour point of 80–85° F. in yield of 85%. Filtration time required for 200 cc. was 20 minutes.

*Example 14*

A crude petrolatum sample of Sample F, Table 1, was admixed at 180° F. with 0.5% of oxidized microcrystalline wax obtained in Example 2. This blend was dissolved in naphtha to produce a 30% solution of the petrolatum. After chilling to 40° F. it was filtered as in Example 9. Filtration of 200 cc. was accomplished in 20 minutes and the wax on the filter was found to have the following properties:

Yield, based on the stock _____percent__ 31
ASTM D938 congealing pt. _____ 167
ASTM D1321 penetration _____ 12

When the example was repeated without oxidized wax, the precipitate was of such nature that practically no separation of phases could be made by filtration even after well over 20 minutes of filtration time was used.

Example 15

A sample of the oxidized microcrystalline wax of Example 6 was treated at 250° F. for 2 hours with 6% by weight of sodium carbonate. A sample of crude petrolatum represented by Sample F of Table 1 was admixed with 0.5% of this neutralized oxidized wax. The blend was dissolved in naphtha to obtain a 30% solution of the crude petrolatum and was chilled to 40° F. The chilled blend was filtered through a Büchner funnel as in Example 7. The wax obtained on the filter in a yield of 41%, based on the deoiling stock, had a congealing point of 164° F. and a needle penetration of 21.

When the example was repeated without the use of the neutralized oxidized microcrystalline wax, the precipitated wax phase was of such a nature that practically no separation of phases could be made by filtration. The wax obtained was therefore extremely soft and had a congealing point of only 150° F.

Example 16

A portion of Mid-Continent undewaxed bright stock (Sample M of Table 2) was admixed with 0.5% of the oxidized microcrystalline wax of Example 2. The blend was dissolved in petroleum ether to obtain a 30% concentration of the bright stock. After chilling to 0° F. it was filtered through paper in a Büchner funnel. In 4 minutes 200 cc. filtered to yield 86% of a 40–45° F. pour point oil.

When the example was repeated without oxidized microcrystalline wax, filtration was very difficult so that even after 20 minutes practically no filtrate was obtained.

Example 17

Portions of Mid-Continent undewaxed bright stock (Sample 3 of Table 2) were admixed with 0.5% of the oxidized microcrystalline wax of Example 2. Samples were admixed with benzol-MEK and with naphtha-MEK, which were chilled to 0° F. and then filtered through paper.

Portions of the same bright stock without added oxidized wax were treated in a similar manner. The results of these experiments were as follows:

TABLE 6.—DEWAXING UNDEWAXED BRIGHT STOCK

| Solvent | Naphtha-MEK | | Benzol-MEK | |
| --- | --- | --- | --- | --- |
| | A | B | C | D |
| Oxidized Wax used, percent | 0.5 | None | 0.5 | None |
| Conc. of Stock, percent | 30 | 30 | 30 | 30 |
| Filtration time/200 cc., minutes | 1 | 15 | 2 | 5 |
| Dewaxed oil yield, percent | 96 | 80 | 91 | 86 |
| Dewaxed oil yield, pour point, ° F | 30–35 | 50–55 | 15–20 | 15–20 |

An alternate method which is also widely used to the use of filter presses and rotary filters for separating the phases of chilled solutions, is the use of centrifuges. Normally continuous super-centrifuges are used and the solvent utilized is normally a petroleum distillate such as naphtha, or hydrocarbons, such as hexane. If the crystals formed during chilling are too large, separation of phases by centrifuging is inefficient. Thus, waxy distillates cannot normally be successfully dewaxed or deoiled by centrifuging.

Conversely, if the wax phase is too microcrystalline, the wax fraction obtained by centrifuging contains much of the oil phase, resulting in soft wax and low dewaxed oil yield.

In the following examples we shall show that oxidized microcrystalline wax can so modify crystal size and form that waxy distillates and microcrystalline wax bearing fractions can both be successfully centrifuged.

Example 18

A portion of a waxy distillate as represented by Sample A of Table 1 was admixed with 1% of the oxidized microcrystalline wax of Example 1. This was dissolved in the amount of 25% in naphtha and was chilled to 20° F. The chilled samples were centrifuged in chilled laboratory model centrifuge at a speed of 2,000 r.p.m. for 20 minutes. The supernatant liquid was decanted from the lower wax layer. The wax was found to have a congealing point of 134 and a needle penetration number of 28, with a yield of 28% based on the wax distillate.

When the example was repeated without the use of oxidized microcrystalline wax, phase separation was very incomplete, so that the wax phase had approximately the same properties as the original wax distillate—its congealing point was 115 and its needle penetration was higher than 200.

Example 19

A portion of crude petrolatum as represented by Sample F of Table 1 was admixed with 0.25% of oxidized microcrystalline wax of Example 1.

Portions of this blend were dissolved in naphtha in 30% and 40% concentration and were chilled to 40° F. The chilled samples were centrifuged as in Example 17.

The example was repeated without the use of oxidized microcrystalline wax. The results were as follows:

TABLE 7.—DEOILING CRUDE PETROLATUM USING CENTRIFUGES

| Conc. of Deoiling Stock | 30% | | 40% | |
| --- | --- | --- | --- | --- |
| Percent oxidized microcrystalline wax used | 0.25 | None | 0.25 | None. |
| Wax yield, percent | 35 | 42 | 39 | No separation of phases. |
| Wax congealing point | 169 | 166 | 166 | |
| Wax penetration, needle | 15 | 41 | 21 | |

Example 20

When Example 19 was repeated with the oxidized microcrystalline wax of Example 2, similar results were obtained.

Example 21

A portion of crude petrolatum, as represented by Example F of Table 1, was admixed with 0.25% of oxidized microcrystalline wax of Example 4, dissolved in naphtha at 30% concentration, chilled to 20° F. and centrifuged as in Example 18. The wax obtained had a needle penetration of 20. When the example was repeated without the use of oxidized microcrystalline wax, the wax obtained had a peneration above 200 because separation of phases was so incomplete.

Example 22

A sample of microcrystalline wax as represented by Sample H of Table 1, was admixed with 2% of the oxidized Fischer-Tropsch wax of Example 5 and was dissolved in naphtha at 15% concentration. When the blend was centrifuged at 80° F., the resultant wax had a needle penetration of 4. When the example was repeated without the use of oxidized microcrystalline, the resultant wax had a penetration of 6.

Example 23

A portion of undewaxed residue from Pennsylvania crude oil of Sample I, Table 2, was admixed with 0.08% oxidized microcrystalline wax of Example 1 and dissolved in naphtha in 32% concentration. When this was chilled to −10° F. and centrifuged on plant scale in Sharples Super-centrifuges, a yield of 81% dewaxed oil of 15–20° F. pour point was obtained.

When this example was repeated, also on plant scale, without the use of oxidized microcrystalline wax, a yield of only 70% dewaxed oil was obtained and its pour point was 55–60° F. However, when a concentration of undewaxed oil in naphtha of only 22% was used, a yield of 79% dewaxed oil of 15–20° F. pour point was obtained. Thus, the oxidized wax permitted the use of much higher concentration of dewaxing stock.

*Example 24*

A portion of Mid-Continent undewaxed bright stock of Sample M, Table 1, was admixed with 0.5% oxidized microcrystalline wax of Example 1. Portions were dissolved in naphtha and in petroleum ether in 50% concentrations. After chilling to 0° F. and centrifuging as in Example 18, dewaxed oil yields of 69 and 65% and pour points of 25–30° F. were obtained.

When Example 23 was repeated without the use of oxidized microcrystalline wax, the chilled naphtha solution did not separate during centrifuging, and the petroleum ether solution yielded only 43% dewaxed oil of 30–35° F. pour point.

*Example 25*

During the chilling of wax-bearing solutions, wax crystallizes out and tends to reduce heat transmission, thereby lengthening the chilling cycle and tying up expensive equipment. This retardation of rate of chilling may be due to the thickening of the chilled mixture, so that it has a jell-like structure, or it may be due to coating the chilling coils with wax, which acts as an insulator. We have found that when the oxidized wax is added prior to chilling, rates of chilling are significantly improved and the viscosity of the chilled solution is significantly lowered. This is exemplified as follows:

A sample of crude petrolatum of properties similar to Sample F of Table 1 was admixed with 1.5% of oxidized microcrystalline wax of Example 1 and dissolved in naphtha in 30% concentration. The solution (220 g.) was placed in a 600 ml. beaker of 3" diameter and was stirred by an electric stirrer at 3½ r.p.m. The stirrer was equipped with 4 vertical blades 1¼" long and 1⅝" high. The assembly was placed in a pan of water kept at 40° F. The time required to chill from 120° F. to 60° F. was only 10 minutes.

When the example was repeated without the use of oxidized microcrystalline wax, chilling time was 26 minutes—a 2.6 fold increase. Similarly, the viscosity at 40° F. of the solution not containing the oxidized wax was more than twice the value of the solution which contained the oxidized wax.

*Example 26*

A portion of Mid-Continent undewaxed bright stock of Sample O, Table 1, was dissolved in hexane solvent (boiling range 120–190° F.) at 130° F. in 26.5% concentration. The hot solution was admixed with 0.2% oxidized microcrystalline wax of Example 1. When this solution was chilled to —54° F. and centrifuged in Sharples Supercentrifuges on a plant scale, a yield of 79% dewaxed oil of 4° F. cold test was obtained.

When this example was repeated, also on a plant scale, without the use of oxidized microcrystalline wax, an inferior product with a pour point of about 20–25° F. was obtained. However, when a concentration of the undewaxed bright stock in the hexane solvent of only 23% was used in the plant, a yield of 71% dewaxed oil of 4° F. cold test was obtained. Thus, the oxidized microcrystalline wax permitted the use of a higher concentration of charge stock in the plant without any change in the properties of the product.

*Example 27*

We have found that the properties and characteristics of the oxidized wax separation aid are critical with respect to their effectiveness in the de-oiling of waxes such as micro-or-macro-waxes, in order to produce a harder wax, or, in the dewaxing of oils, as for example, lubricating oils, in order to reduce their pour point.

(a) A microcrystalline wax obtained by dewaxing bright stock from Mid-Continent-type crude oil, in 250 gram amounts and having the following initial values:

| | |
|---|---|
| Melting point, ° F. | 176.7 |
| Penetration at 77° F. | 18 |
| Saponification No. | <0.03 |
| Acid No. | <0.03 | was oxidized in a two-liter, three-necked flask for 5.5 hours with a flow rate of 0.5 cubic foot of substantially pure oxygen/minute, the oxygen being bubbled up through the melted wax. The reaction temperature was 300–350° F. and the catalyst was 1% by weight of manganese stearate promoted with 0.1% by weight of magnesium oxide.

At the end of the 5.5 hour reaction period, the product had a saponification number of 86 and an acid number of 32. The oxidized material was filtered free of the catalyst-promoter combination, heated to about 150° F. temperature in a separate system, and a mixture of methyl ethyl ketone (66% by volume) and toluene (33% by volume) was added to the oxidized wax with mixing until the volume ratio of solvent-antisolvent wax was 10:1. The solvent-antisolvent mixture containing the dissolved, oxidized wax was cooled to about —6° F. and a wax precipitated out. The solution was filtered from the precipitate, and the precipitate was dried free of solvent and recovered as product A. The solvent-antisolvent combination was then stripped by vacuum distillation from the dissolved wax remaining in solution to recover product B.

TABLE I.—OXIDATION OF MICROCRYSTALLINE WAX

Properties of microcrystalline wax

| | |
|---|---|
| Used for oxidation: | |
| Melting point, ° F. | 178 |
| Penetration at 77° F. | 19 |
| Saponification No. | 0.0 |
| Acid No. | 0.0 |
| Oxidation conditions: | |
| Amount of wax, g. | 250 |
| Oxidant | Pure oxygen |
| Catalyst: Manganese stearate, percent | 1 |
| Promoter: Magnesium oxide, percent | 0.1 |
| Temp. of oxidation, ° F. | 300–350 |
| Reaction time, hours | 5 |
| Oxidized wax product: | |
| Melting point, ° F. | 162 |
| Penetration at 77° F. | 17 |
| Saponification No. | 86 |
| Acid No. | 32 |

Fractionation of oxidized wax:

| | Product "A" | Product "B" |
|---|---|---|
| Percent Recovery | 70 | 30 |
| Melting Point, ° F | 165 | 110 |
| Penetration at 77° F | 8 | |
| Saponification No | 64 | 112 |
| Acid No | 20 | 46 |

(b) The microcrystalline wax employed in (a) was oxidized under substantially the same conditions as used in (a) but with cobalt stearate as the catalyst.

After oxidation, the product was fractionated as described in (a). The properties of the oxidized wax and of the fractionated products are set out in Table II.

TABLE II.—OXIDIZED MICROCRYSTALLINE WAX USING COBALT STEARATE CATALYST

|  | Oxidized Wax | Fractionated Waxes | |
|---|---|---|---|
|  |  | Product "A" | Product "B" |
| Melting Point, °F | 166 | 168 | 161 |
| Penetration at 77° F | 12 | 8 | 35 |
| Saponification No | 88 | | |
| Acid No | 30 | | |
| Percent Recovery | | 45 | 55 |

(c) An oxidized wax was prepared in accordance with Examples 1 and 4 of the instant application. The oxidized wax obtained had the following properties:

Melting point, °F. ----------------------------- 183
Penetration at 77° F. --------------------------- 8
Saponification No. ----------------------------- 75
Acid No. -------------------------------------- 32

(d) The oxidized waxes prepared according to (a) and (b) above were evaluated as de-oiling aids in a separation process carried out under centrifugation. A crude petrolatum was treated with the oxidized product of (a), (b), and (c) as hereinafter set forth, and a comparison of their effectiveness undertaken.

The basis of the evaluation is as set out in Example 19 of the instant application.

35% by volume of a Mid-Continent crude petrolatum was dissolved in naphtha. The oxidized wax was added in an amount of 0.25% by weight based on the weight of crude petrolatum to the naphtha. Thereafter, the solution was chilled to 50° F. and centrifuged in a laboratory centrifuge at 2500 r.p.m. for 10 minutes. The supernatant solution in each case was decanted and the precipitated wax freed of solvent.

The effectiveness of each of the oxidized waxes as a de-oiling aid in a centrifuging process was then evaluated on the basis of the yield and hardness of the wax product recovered from the crude petrolatum. The data obtained are set out in Table III.

TABLE III.—EVALUATION OF OXIDIZED WAXES AS DE-OILING AIDS IN THE MANUFACTURE OF WAX FROM CRUDE PETROLATUM BY THE CENTRIFUGE PROCESS

| De-Oiling Aid | De-oiling Conditions | | Wax Manufacture | | |
|---|---|---|---|---|---|
|  | Conc. of Petrolatum, Percent | End Temp., °F | Yield, Percent | Melting Point, °F. | Pen. at 77° F. |
| None | 35 | 50 | No separation | | |
| ¼% Applicants' Oxidized Wax (c) | 35 | 50 | 44 | 161 | 30 |
| ¼% Oxidized Wax (a) | 35 | 50 | 65 | 154 | 69 |
|  |  |  | (Poor Separation) | | |
| ¼% Oxidized Product "A" (a) | 35 | 50 | No separation | | |
| ¼% Oxidized Product "B" (a) | 35 | 50 | No separation | | |
| ¼% Oxidized Wax (b) | 40 | 40 | 70 | 153 | 81 |
| ¼% Oxidized Product "A" (b) | 40 | 40 | (Poor Separation) | | |
|  |  |  | No separation | | |
| ¼% Oxidized Product "B" (b) | 40 | 40 | No separation | | |
| None | 24 | 40 | 42 | 162 | 28 |

(e) The effectiveness of the oxidized product of (a) and (b) above and the oxidized product of the application was compared with respect to effectiveness in the filtration process of manufacturing lubricating oil from the long residuum of Pennsylvania crude oil. The long residuum of Pennsylvania crude oil was dissolved in an amount of 30% by volume in naphtha. The oxidized waxes were added in an amount of 1% by weight based on the weight of long residuum to the resulting naphtha solution. The solutions were chilled to 40° F. and each solution filtered through a Büchner funnel. The volume of filtrate collected in a 5-minute period was determined for each solution. The filtration rates as determined are shown in Table IV.

TABLE IV.—EVALUATION OF OXIDIZED WAXES AS DEWAXING AIDS IN THE MANUFACTURE OF LUBRICATING OIL FROM LONG RESIDUUM FROM PENNSYLVANIA CRUDE OIL

| Dewaxing Aid | De-oiling Conditions | | Filtration Rate (Volume per 5 minutes), ml. |
|---|---|---|---|
|  | Long Residuum Conc., percent | End Temp., °F. |  |
| None | 30 | 40 | 4 |
| 1% Applicants' Oxidized Wax (c) | 30 | 40 | 132 |
| 1% Oxidized Wax (a) | 30 | 40 | 48 |
| 1% Oxidized Product "A" (a) | 30 | 40 | 74 |

(f) Slack wax (melting point 148° F.) was oxidized at 450° F. using pure oxygen for a period of 5 hours. The oxidation procedure was repeated but using a cobalt naphthenate catalyst. The properties of the products obtained are set out in Table V.

TABLE V.—OXIDIZED SLACK WAX

|  | (f) | |
|---|---|---|
|  | No Catalyst | Cobalt Catalyst |
| Acid No | 22 | 16 |
| Saponification No | 75 | 42 |

(g) A scale wax having a melting point of 122° F. and a penetration at 77° F. of 46 was oxidized with air at a temperature of 270° F. using, as catalyst, 1% manganese naphthenate. There was obtained an oxidized scale wax having an acid number of 35 and a saponification number of 105.

(h) Petrolatum was oxidized with air at 270° F. using 1% manganese naphthenate as catalyst to produce oxidized petrolatum having an acid number of 24 and a saponification number of 70.

(i) Paraffin wax, as an instance of the "chemically refined water-white waxes" was oxidized at 260–280° F. with air both with and without a catalyst to produce oxidized paraffin waxes having acid and saponification numbers of 33 and 117 and of 63 and 154, respectively.

(j) A mineral oil was oxidized with air at 260–280° F. using 1% manganese naphthenate catalyst to thereby obtain an oxidized oil having an acid number of 38 and a saponification number of 122.

(k) The oxidized products prepared according to (f) and (h) were evaluated as de-oiling aids. The evaluation was carried out substantially as set out in Example 19 of the instant patent application. The conditions used for the evaluation of the various products were as described in (d) (above) but the concentration of crude petrolatum was only 28% (end temperature 45° F.) in order to allow the activity, if any, of all of the products to be demonstrated. The results of these tests are shown in Table VI.

TABLE VI.—DE-OILING CRUDE PETROLATUM WITH OXIDIZED PRODUCTS AS CENTRIFUGE AIDS

| De-oiling Aid | Wax Manufacture | | |
|---|---|---|---|
| | Yield, Percent | Melting Point, °F. | Pen. at 77° F. |
| ⅛% applicants' Oxidized Wax (c) | 39 | 163 | 23 |
| None | 52 | 158 | 58 |
| ¼% Oxid. Slack Wax—No Catalyst (f) | (Poor separation) | 158 | 61 |
| ¼% Oxid. Slack Wax-Cobalt Catalyst (f) | (Poor separation) | 159 | 62 |
| ¼% Oxid. Scale Wax (g) | Poor separation | | |
| ½% Oxid. Petrolatum (h) | Poor separation | | |
| ¼% Oxid. Paraffin Wax (i) | Poor separation | | |
| ½% Oxid. Mineral Oil (j) | Poor separation | | |

(1) The oxidized slack waxes made according to (f) above were also evaluated as dewaxing aids in the filtration process of manufacturing lubricating oil from the long residuum of Pennsylvania crude oil. The results of this experiment are shown in Table VII.

TABLE VII.—DEWAXING LONG RESIDUUM FROM PENNSYLVANIA CRUDE OIL WITH OXIDIZED SLACK WAX MADE ACCORDING TO (f)

| Dewaxing Aid | Deoiling Conditions | | Filtration Rate (Vol. per 3 minutes), ml. |
|---|---|---|---|
| | Long Resid. Conc., Percent | End Temp., °F. | |
| 1% Applicants' Oxidized Wax (c) | 30 | 40 | 106 |
| 1% Oxid. Slack Wax—No catalyst (b) | 30 | 40 | 84 |
| 1% Oxid. Slack Wax—Cobalt Catalyst (b) | 30 | 40 | 59 |

A comparison of the oxidized waxes prepared in accordance with (a) and (b) with that of the oxidized was prepared in (c) shows that the oxidized wax of (c) differs from the waxes of (a) and (b) in its properties and characteristics.

Table III which depicts the result of an evaluation of the oxidized waxes of (a) and (b) with that of the application with respect to effectiveness as de-oiling aids in the manufacture of wax from crude petrolatum by the centrifuge process shows that the separation of the wax phase from the oil solution phase is poor at concentrations of 35% or more of the petrolatum in naphtha when no oxidizing wax prepared according to the application is present. The oxidized waxes made according to (a) and (b) are shown not to be suitable as de-oiling aids for the centrifuging process.

The oxidized products of (a) and (b) are similarly ineffective as de-waxing aids for the filtration process, as can be seen from Table IV.

The oxidation products corresponding to those of (f)-(h) (oxidized slack wax, oxidized scale wax, oxidized petrolatum, oxidized paraffin wax, and oxidized mineral oil) do not demonstrate any de-oiling activity in the centrifuge process, as can be seen from Table VI.

The oxidation products, i.e., oxidized slack wax, (f)-(h), is much less effective than the oxidized microcrystalline wax produced in accordance with the invention as a de-waxing aid for increasing the rate of filtration, as can be seen from Table VII.

While the invention has been described in detail with reference to certain specific embodiments, various changes and modifications which fall within the spirit of the invention and the scope of the appended claims will become apparent to the skilled artisan. The invention therefore is only intended to be limited by the appended claims or their equivalent wherein we have attempted to claim all inherent novelty.

We claim:
1. In the method of separating wax from oil in which a wax-oil mixture is dissolved in an organic solvent, the solution cooled to a temperature at which wax solidifies and the solid wax separated from the liquid phase, the improvement of maintaining a minor quantity of an oxidized micro-crystalline wax having an acid number (ASTM D1386–55T) of 15 to 40, a saponification number (ASTM D1387–55T) of 35 to 100 and a Saybolt viscosity at 210° F. (ASTM D88–56) of 150–600, in the solution during said cooling.

2. Improvement according to claim 1 in which about 0.05% to 2% oxidized microcrystalline wax based on the material to be deoiled or dewaxed is maintained in the solution.

3. Improvement according to claim 1 in which said organic solvent is a member selected from the group consisting of naphtha, benzol, methyl ethyl ketone, naphtha-methyl ethyl ketone, ethylene dichloride, propane, hexane, toluene methyl ethyl ketone, benzol-methyl ethyl ketone and ethylene dichloride-benzol.

4. Improvement according to claim 1 in which said oxidized microcrystalline wax is at least partially neutralized with an alkaline agent selected from the group consisting of alkali metal and alkaline earth metal compounds and said separation of the solid wax effected by filtration.

5. Improvement according to claim 1 in which said oxidized microcrystalline wax has a saponification number (ASTM D1387–55T) of 70–90, an acid number (ASTM D1386–55T) of about 25 to 35 and Saybolt viscosity at 210° F. (ASTM D88–56) of 200 to 350.

6. Improvement according to claim 5 in which said oxidized microcrystalline wax has an ASTM D127 melting point between about 181° F. and 200° F.

References Cited by the Examiner

UNITED STATES PATENTS

| | | | |
|---|---|---|---|
| 2,055,482 | 9/1936 | Davis | 208—3 |
| 2,119,940 | 6/1938 | Carr et al. | 208—3 |
| 2,158,671 | 5/1939 | Carr et al. | 208—33 |
| 2,767,205 | 10/1956 | Thompson | 208—3 |
| 2,794,040 | 5/1957 | Annable et al. | 260—451 |
| 3,050,455 | 8/1962 | Vosser | 208—3 |

OTHER REFERENCES

Bennett, "Commercial Waxes," second edition, 1956, page 104, published by Chemical Publication Co., New York.

Werth, "The Chemistry and Technology of Waxes," second edition, 1956, pages 528 to 530, published by Reinhold Publishing Corp., New York.

PAUL M. COUGHLAN, *Primary Examiner.*

ALPHONSO D. SULLIVAN, *Examiner.*